(12) United States Patent
Lai (10) Patent No.: US 11,941,433 B2
(45) Date of Patent: Mar. 26, 2024

(54) COMPUTING APPARATUS AND DATA PROCESSING METHOD FOR OFFLOADING DATA PROCESSING OF DATA PROCESSING TASK FROM AT LEAST ONE GENERAL PURPOSE PROCESSOR

(71) Applicant: VIA Technologies Inc., New Taipei (TW)

(72) Inventor: Jiin Lai, New Taipei (TW)

(73) Assignee: VIA Technologies Inc., New Taipei (TW)

(*) Notice: Subject to any disclaimer, the term of this patent is extended or adjusted under 35 U.S.C. 154(b) by 562 days.

(21) Appl. No.: 17/180,882

(22) Filed: Feb. 22, 2021

(65) Prior Publication Data

US 2021/0303338 A1 Sep. 30, 2021

Related U.S. Application Data

(60) Provisional application No. 63/019,437, filed on May 4, 2020, provisional application No. 63/014,697, filed (Continued)

(30) Foreign Application Priority Data

Jan. 26, 2021 (TW) ................................ 110102826

(51) Int. Cl.
*G06F 9/46* (2006.01)
*G06F 9/38* (2018.01)
(Continued)

(52) U.S. Cl.
CPC .......... *G06F 9/4856* (2013.01); *G06F 9/3877* (2013.01); *G06F 9/546* (2013.01); *H04L 47/193* (2013.01); *H04L 69/16* (2013.01)

(58) Field of Classification Search
CPC ...... G06F 9/4856; G06F 9/3877; G06F 9/546; H04L 47/193; H04L 69/16
See application file for complete search history.

(56) References Cited

U.S. PATENT DOCUMENTS

2018/0052708 A1\* 2/2018 Ganesan ............. G06F 11/1482
2018/0267878 A1\* 9/2018 Guim Bernat ...... G06F 11/3409
(Continued)

FOREIGN PATENT DOCUMENTS

CN 108089920 A 5/2018
CN 109471732 A 3/2019
(Continued)

*Primary Examiner* — Tammy E Lee
(74) *Attorney, Agent, or Firm* — Winston Hsu (57) ABSTRACT

A computing apparatus includes at least one general purpose processor, at least one coprocessor, and at least one application specific processor. The at least one general purpose processor is arranged to run an application, wherein data processing of at least a portion of a data processing task is offloaded from the application running on the at least one general purpose processor. The at least one coprocessor is arranged to deal with a control flow of the data processing without intervention of the application running on the at least one general purpose processor. The at least one application specific processor is arranged to deal with a data flow of the data processing without intervention of the application running on the at least one general purpose processor.

20 Claims, 6 Drawing Sheets

Related U.S. Application Data on Apr. 23, 2020, provisional application No. 62/993,720, filed on Mar. 24, 2020.

(51) Int. Cl.
  *G06F 9/48*   (2006.01)
  *G06F 9/54*   (2006.01)
  *H04L 47/193*   (2022.01)
  *H04L 69/16*   (2022.01)

(56) References Cited

U.S. PATENT DOCUMENTS

| | | | |
|---|---|---|---|
| 2020/0073849 | A1 | 3/2020 | Dormitzer |
| 2020/0081850 | A1 | 3/2020 | Singh |
| 2020/0233717 | A1* | 7/2020 | Smith .................. G06F 9/5044 |
| 2020/0310694 | A1* | 10/2020 | Gao ..................... G06F 3/0683 |

FOREIGN PATENT DOCUMENTS

| | | |
|---|---|---|
| CN | 110618871 A | 12/2019 |
| TW | 201915724 A | 4/2019 |
| TW | 201933080 A | 8/2019 |

\* cited by examiner

COMPUTING APPARATUS AND DATA PROCESSING METHOD FOR OFFLOADING DATA PROCESSING OF DATA PROCESSING TASK FROM AT LEAST ONE GENERAL PURPOSE PROCESSOR

CROSS REFERENCE TO RELATED APPLICATIONS

This application claims the benefit of U.S. provisional application No. 62/993,720 filed on Mar. 24, 2020, U.S. provisional application No. 63/014,697 filed on Apr. 23, 2020, and U.S. provisional application No. 63/019,437 filed on May 4, 2020. The entire contents of related applications, including U.S. provisional application No. 62/993,720, U.S. provisional application No. 63/014,697, and U.S. provisional application No. 63/019,437, are incorporated herein by reference.

BACKGROUND OF THE INVENTION

1. Field of the Invention

The present invention is related to data processing, and more particularly, to a data processing method for offloading data processing of at least a portion of a data processing task from at least one general purpose processor through at least one coprocessor and at least one application specific processor and an associated computing apparatus.

2. Description of the Prior Art

According to traditional computer architecture, a storage device may perform data transaction with a central processing unit (CPU) through a bus. For example, a solid-state drive (SSD) can be connected to a Peripheral Component Interconnect Express (PCIe) bus or a Serial Advanced Technology Attachment (SATA) bus. In this way, the CPU of a host side can write data to the SSD of the host side through the PCIe bus/SATA bus, and the SSD of the host side can also transmit stored data to the CPU of the host side through the PCIe bus/SATA bus. In addition, with the development of network technology, the storage device can be deployed at a remote side and connected to the host side through the network. In this way, the CPU of the host side can write the data to the storage device of the remote side through the network, and the storage device of the remote side can also transmit the stored data to the CPU of the host side through the network.

Whether the storage device is installed on the host side or deployed at the remote side, the applications executed on the CPU will need to read data from the storage device for processing according to the traditional computer architecture. Since performing data movement through the CPU takes a lot of time, an innovative data processing method and an associated computing apparatus are urgently needed for enhancing the efficiency of data processing.

SUMMARY OF THE INVENTION

It is therefore an objective of the present invention to provide a data processing method for offloading at least a portion of a data processing of a data processing task from at least one general purpose processor through at least one coprocessor and at least one application specific processor and an associated computing apparatus.

In an embodiment of the present invention, a computing apparatus is provided. The computing apparatus includes at least one general purpose processor, at least one coprocessor and at least one application specific processor. The at least one general purpose processor is arranged to run an application, wherein data processing of at least a portion of a data processing task is offloaded from the at least one general purpose processor. The at least one coprocessor is arranged to deal with a control flow of the data processing without intervention of the application running on the at least one general purpose processor. The at least one application specific processor is arranged to deal with a data flow of the data processing without intervention of the application running on the at least one general purpose processor.

In another embodiment of the present invention, a data processing method is provided. The data processing method includes: running an application through at least one general purpose processor, wherein data processing of at least a portion of a data processing task is offloaded from the at least one general purpose processor; and without intervention of the application running on the at least one general purpose processor, dealing with a control flow of the data processing through at least one coprocessor and dealing with a data flow of the data processing through at least one application specific processor.

The computing apparatus of the present invention may be equipped with a network subsystem to connect to the network and perform related data processing regarding object storage, so the computing apparatus of the present invention has extremely high scalability. In an application, the computing apparatus of the present invention is compatible with existing object storage services (e.g. Amazon S3 or other cloud storage services); therefore, the computing apparatus of the present invention may refer to the object storage commands (e.g. Amazon S3 Select) from the network to perform related data processing of data capture regarding an object storage device connected to the computing apparatus. In another application, the computing apparatus of the present invention may receive NVMe/TCP commands from the network, and refer to the NVMe/TCP commands to perform associated data processing operations on the storage device connected to the computing apparatus. If the storage device connected to the computing apparatus is a portion of a distributed storage system (e.g. a portion of a key value database), the NVMe/TCP commands received from the network may include key-value commands, and the computing apparatus of the present invention may refer to the key-value commands to perform key value database related data processing operations on the storage device. In addition, processing of a data may be completed by a hardware accelerator circuit during the movement of the data, and the general purpose processor that runs the application is not required to intervene in the data movement and the communication between the software and the hardware during the data movement process; therefore, the in-network computation and/or in-storage computation may be implemented, thereby saving power consumption, reducing latency and reducing the load of the general purpose processor. Furthermore, the computing apparatus of the present invention may be implemented by using a multiprocessor system on a chip (MPSoC). For example, the MPSoC may include a field programmable gate array (FPGA) and a general purpose processor core using the ARM architecture, thus having high design flexibility. Designers may design the application/code to be executed by the general purpose processor core and the hardware data processing acceleration function to be embodied by the FPGA according to their needs. For example, the computing apparatus of the present invention may be applicable to a data center, and various data types and storage formats may be supported through customization and the best performance may be obtained. Since a single MPSoC may be sufficient to take the place of a high-end server, the data center using the computing apparatus of the present invention may have a lower construction cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
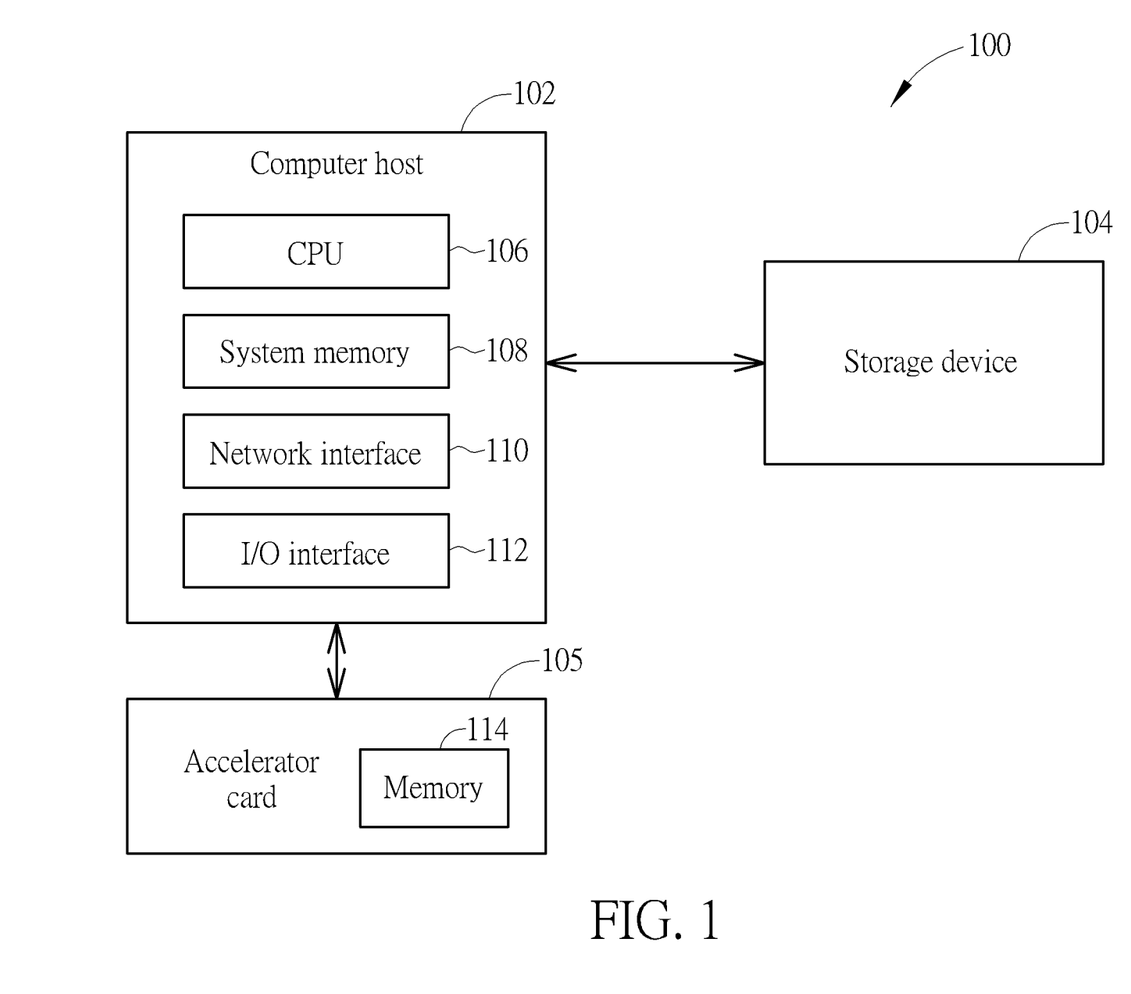
FIG. 1 is a diagram illustrating a computer system using an accelerator card.

FIG. 1 is a diagram illustrating a computer system using an accelerator card. The computer system 100 includes a computer host 102, a storage device 104, and an accelerator card 105. The computer host 102 includes a central processing unit (CPU) 106, a system memory 108, a network interface 110, an input/output (I/O) interface 112, and other components (not shown). The storage device 104 may be connected to the computer host 102 through the network interface 110 or the I/O interface 112. The accelerator card 105 may be connected to the computer host 102 through the I/O interface 112. For example, the network interface 110 may provide wired network access or wireless network access, and the I/O interface 112 may be a PCIe interface. In this example, the accelerator card 105 is a PCIe interface card, which may be inserted into a slot of the I/O interface 112. For example, the accelerator card 105 may be an FPGA based interface card, which may be arranged to accelerate data processing and other applications. Compared with using the CPU 106 to do calculations, using the accelerator card 105 has the advantages of greater data throughput, lower processing latency and lower power consumption. When the computer system 100 is running, the CPU 106 first moves stored data to be processed from the storage device 104 to the system memory 108, and then moves the stored data to be processed from the system memory 108 to a memory 114 of the accelerator card 105; afterwards, the accelerator card 105 reads the data in the memory 114 to perform calculations, and returns the calculation results to the CPU 106. In addition, the CPU 106 may need to perform format conversion upon the stored data to be processed in the storage device 104 first, and then move the data conforming to the required data format of the accelerator card 105 to the memory 114 on the accelerator card 105. Although the accelerator card 105 may provide greater data throughput, lower processing latency and lower power consumption, the accelerator card 105 is connected to the I/O interface 112 (e.g. the PCIe interface) of the computer host 102; therefore, the CPU 106 stills needs to intervene in the data format conversion and/or the data movement between the storage device 104 and the accelerator card 105. For example, according to the traditional computer architecture, the CPU 106 needs to deal with layers of input/output (I/O) stack, and based on the von Neumann architecture, the CPU 106 needs to execute frequent load/store operations. As a result, even if the computer system 100 is additionally equipped with the accelerator card 105, the overall data processing performance of the computer system 100 may not benefit from the accelerator card 105 for having a significant improvement due to these factors. Furthermore, the accelerator card 105 is directly connected to the I/O interface 112 (e.g. the PCIe interface) of the computer host 102, so the accelerator card 105 lacks scalability.

Figure 2:
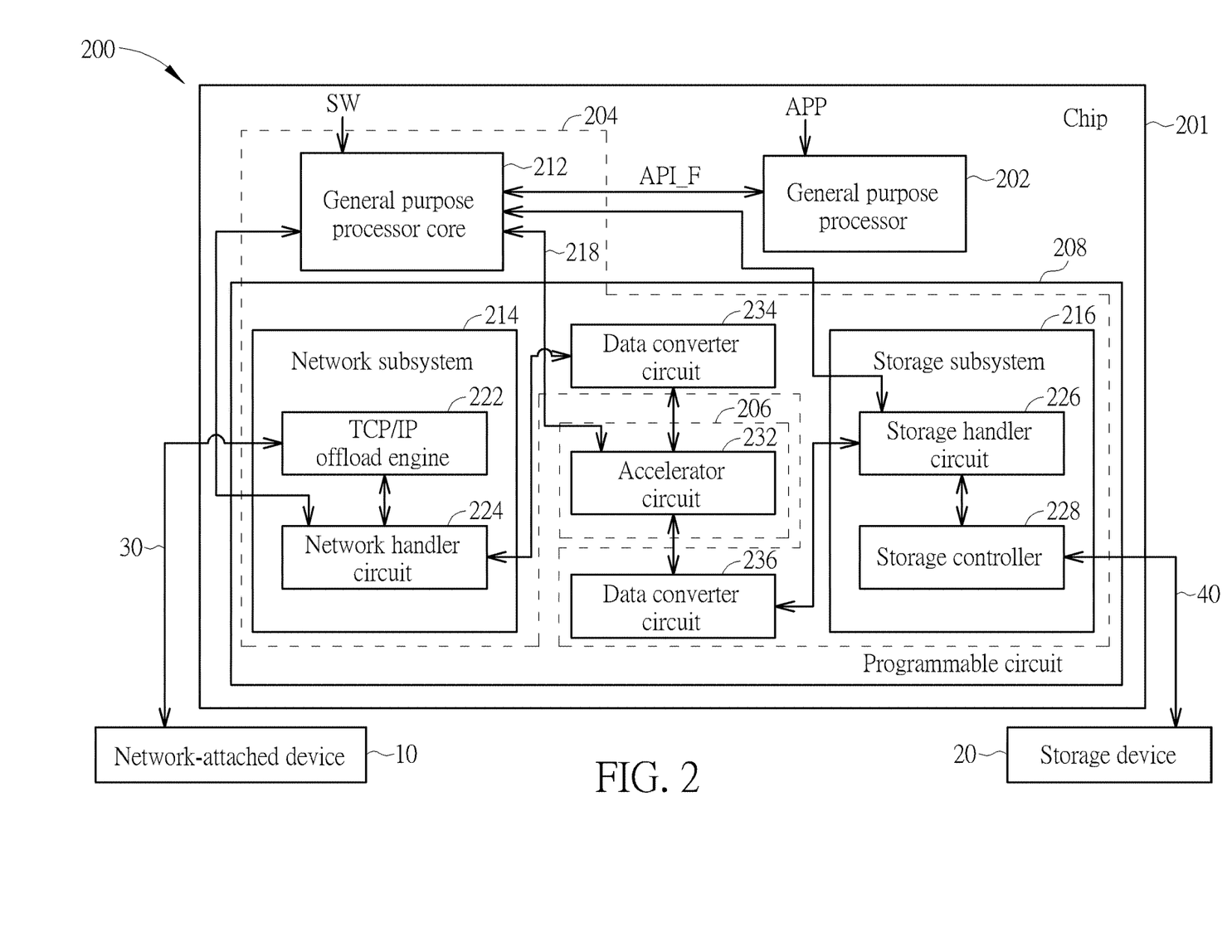
FIG. 2 is a diagram illustrating a computing apparatus according to an embodiment of the present invention.

In order to improve the aforementioned shortcomings of the computer system 100 using the accelerator card 105, the present invention provides new hardware acceleration architecture. FIG. 2 is a diagram illustrating a computing apparatus according to an embodiment of the invention. The computing apparatus 200 includes at least one general purpose processor 202, at least one coprocessor 204, and at least one application specific processor 206. For brevity, FIG. 2 illustrates only one general purpose processor 202, only one coprocessor 204, and only one application specific processor 206. However, in actual applications, the number of general purpose processors 202, the number of coprocessors 204, and the number of application specific processors 206 may be determined according to requirements, and the present invention is not limited thereto. In this embodiment, the general purpose processor 202, the coprocessor 204, and the application specific processor 206 are all disposed in a same chip 201. For example, the chip 201 may be a multiprocessor system on a chip (MPSoC); however, the present invention is not limited thereto. In addition, the general purpose processor 202 includes at least one general purpose processor core (not shown), the coprocessor 204 includes at least one general purpose processor core 212 and a portion of a programmable circuit 208, and the application specific processor 206 includes another portion of the programmable circuit 208. For example, the general purpose processor core may adopt x86 architecture or Advanced RISC Machine (ARM) architecture, and the programmable circuit 208 may be an FPGA. In this embodiment, the general purpose processor 202 (which consists of only general purpose processor core (s)) and coprocessor 204 (which consists of general purpose processor core (s) and the FPGA) are heterogeneous processors, wherein the general purpose processor 202 is responsible for executing the application APP, and the processing related to the I/O stack and the data movement are completely handled by the coprocessor 204. In addition, since the application specific processor 206 is implemented by the FPGA, using the application specific processor 206 may have advantages, including greater data throughput, lower processing latency, lower power consumption, etc., compared with using the general purpose processor 202 to perform data processing. For example, the application specific processor 206 may get rid of the von Neumann architecture, and may use other architecture, such as pipeline or data flow, to provide a parallel data processing function, thereby having better data processing performance.

Figure 3:
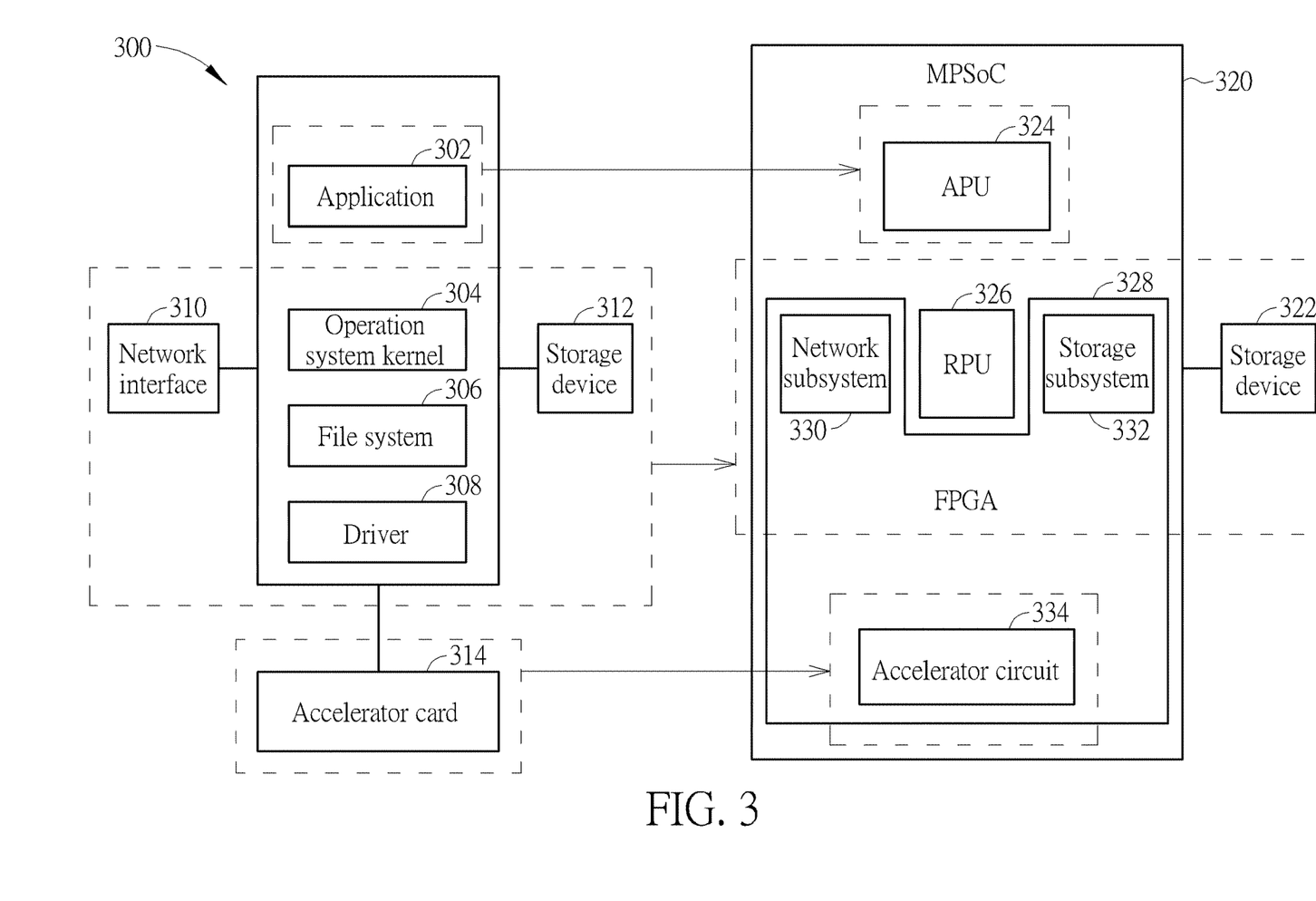
FIG. 3 is a diagram illustrating a functional correspondence relationship between a computing apparatus of the present invention and a computer system using an accelerator card.

In an application using an MPSoC to implement the computing apparatus 200, the processor core of the general purpose processor 202 may be an application processor unit (APU) implemented by ARM Cotex-A53, the general purpose processor core 212 may be a real-time processor unit (RPU) implemented by ARM Cotex-R5, and the programmable circuit 208 may be an FPGA. FIG. 3 is a diagram illustrating a functional correspondence relationship between a computing apparatus of the present invention and a computer system using an accelerator card. A computer system 300 may be a traditional server, and may execute an application 302, an operation system kernel 304, a file system 306, and a driver 308 through a CPU (not shown). In addition, the computer system 300 is equipped with a network interface 310 to provide a network access function. The computer system 300 may provide access of large volumes of data by using a storage device 312, and may provide a data processing acceleration function through an accelerator card 314 (e.g. the PCIe interface card). The computing apparatus 200 may be implemented by an MPSoC 320. Based on the architecture shown in FIG. 2, the MPSoC 320 may include an APU 324, an RPU 326, and an FPGA 328, wherein a network subsystem 330, a storage subsystem 332, and an accelerator circuit 334 are all implemented by the FPGA 328. The functions of the APU 324 correspond to the application 302. The functions of the combination of the network subsystem 330, the RPU 326, the storage subsystem 332, and the storage device 322 correspond to the combination of the network interface 310, the operation system kernel 304, the file system 306, the driver 308 and the storage device 312. The functions of the accelerator circuit 334 correspond to the accelerator card 314. In contrast to the computer system 300, the MPSoC 320 is capable of offloading at least a portion of the data processing task from the APU 324 through the RPU 326 and the FPGA 328 (more particularly, the accelerator circuit 334), which may prevent the APU 324 from spending a lot of time processing the data movement. The details of the computing apparatus 200 of the present invention are further described as follows.

Please refer to FIG. 2. The general purpose processor 202 is arranged to execute the application APP, wherein data processing of at least a portion (e.g. part or all) of a data processing task is offloaded from the general purpose processor 202. In other words, the general purpose processor 202 does not need to intervene in the data processing of at least a portion of the data processing task; as a result, the general purpose processor 202 does not need to perform any processing on layers of input/output stack regarding the flow of the data processing. The coprocessor 204 is arranged to deal with a control flow of the data processing without intervention of the APP running on the general purpose processor 202. In addition, the application specific processor 206 is arranged to deal with a data flow of the data processing without intervention of the APP running on the general purpose processor 202. In the embodiment, the APP running on the general purpose processor 202 may offload the data processing of at least a portion of the data processing task to the coprocessor 204 and the application specific processor 206 by calling an application programming interface (API) function API_F.

The general purpose processor core 212 of the coprocessor 204 may load and execute program code SW to execute and control the processing of layers of the input/output stack. Furthermore, the general purpose processor core 212 communicates with the programmable circuit 208 so that the processing of the entire data flow may be successfully completed without intervention of the general purpose processor 202. In addition, the coprocessor 204 further includes a network subsystem 214, a storage subsystem 216, and a plurality of data converter circuits 234, 236, wherein all of the network subsystem 214, the storage subsystem 216, and the plurality of data converter circuits 234, 236 are implemented by using the programmable circuit 208. The network subsystem 214 includes a transmission control protocol/internet protocol (TCP/IP) offload engine 222 and a network handler circuit 224. The TCP/IP offload engine 222 is arranged to deal with TCP/IP stack between the network handler circuit 224 and a network-attached device 10. For example, the network-attached device 10 may be a client or an object storage device in a distributed object storage system, and is connected to the computing apparatus 200 through a network 30. Therefore, the commands or data of the distributed object storage system may be transmitted to the computing apparatus 200 through the network 30. Since the TCP/IP offload engine 222 is responsible for the processing of network layer, the general purpose processor core 212 does not need to intervene in the processing of the TCP/IP stack. The network handler circuit 224 is arranged to communicate with the general purpose processor core 212 and control a network flow.

In this embodiment, the application specific processor 206 is implemented by the programmable circuit 208, and includes at least one accelerator circuit 232. For brevity, FIG. 2 illustrates only one accelerator circuit 232; however, in actual applications, the number of accelerator circuits 232 may be determined according to requirements. For example, each accelerator circuit 232 is designed to execute a kernel function; as a result, the application specific processor 206 may be configured to have a plurality of accelerator circuits 232 to execute different kernel functions, respectively. Please note that the kernel function does not perform any processing on layers of the input/output stack.

The accelerator circuit 232 is designed to provide the hardware data processing acceleration function, wherein the accelerator circuit 232 may receive a date input from the network handler circuit 224, and process the data flow of the data processing of at least a portion of the data processing task according to the data input. If a data format of payload data derived from the network flow is different from a pre-defined data format requested by the accelerator circuit 232, the data converter circuit 234 is arranged to deal with the data conversion between the network handler circuit 224 and the accelerator circuit 232. For example, the payload data derived and outputted from the network flow by the network handler circuit 224 includes a complete data, and the kernel function executed by the accelerator circuit 232 only needs to process a specific field in the complete data. Therefore, the data converter circuit 234 extracts the specific field from the complete data and sends the extracted specific field to the accelerator circuit 232. In addition, if the network-attached device 10 is a portion of the distributed object storage system and is connected to the computing apparatus 200 through the network 30, the network handler circuit 224 may be arranged to control the network flow between the accelerator circuit 232 and the network-attached device 10.

The storage subsystem 216 includes a storage handler circuit 226 and a storage controller 228. The storage handler circuit 226 is arranged to communicate with the general purpose processor core 212 and control data access of a storage device 20. For example, the storage handler circuit 226 may perform message transmission, synchronization processing and data flow control in response to the API function that is related to the data access. The storage controller 228 is configured to perform data storing for the storage device 20. For example, the storage device 20 may be an SSD connected to the computing apparatus 200 through an input/output interface 40 (e.g. the PCIe interface or the SATA interface), and the storage controller 228 outputs a write command, a write address, and write data to the storage device 20 for performing data writing, and outputs a read command and a read address to the storage device 20 for performing data reading.

The acceleration circuit 232 is designed to provide a hardware data processing acceleration function, wherein the acceleration circuit 232 may receive a data input from the storage handler circuit 226, and deal with the data flow of the data processing of at least a portion of the data processing task according to the data input. If a data format of data derived from the storage handler circuit 226 is different from a pre-defined data format requested by the accelerator circuit 232, the data converter circuit 236 is arranged to deal with data conversion between the storage handler circuit 226 and the accelerator circuit 232. For example, the data derived and outputted from the storage handler circuit 226 includes a complete data, and the kernel function executed by the accelerator circuit 232 only needs to process a specific field in the complete data. Therefore, the data converter circuit 236 extracts the specific field from the complete data and sends the extracted specific field to the accelerator circuit 232.

For brevity, FIG. 2 illustrates only one data converter circuit 234 between the accelerator circuit 232 and the network handler circuit 224, and illustrates only one data converter circuit 236 between the accelerator circuit 232 and the storage handler circuit 226. However, in actual applications, the number of data converter circuit 234 and the number of data converter circuits 236 may be determined according to requirements. For example, in another embodiment, the application specific processor 206 may include a plurality of accelerator circuits 232 arranged to execute different kernel functions, respectively. Since different kernel functions have different data format requirements, a plurality of data converter circuits 234 may be set between the application specific processor 206 and the network handler circuit 224 to perform different data format conversions, respectively, and a plurality of data converter circuits 236 may be set between the application specific processor 206 and the storage handler circuit 226 to perform different data format conversions, respectively.

As described above, the general purpose processor 202 may offload the data processing of at least a portion of the data processing task to the coprocessor 204 and the application specific processor 206, wherein the coprocessor 204 is responsible for a control flow of the data processing (which includes at least the processing of layers of the input/output stack), and the application specific processor 206 is responsible for a data flow of the data processing. In this embodiment, the computing apparatus 200 further includes a control channel 218, wherein the control channel 218 is coupled to the pins of the application specific processor 206 (more particularly, the accelerator circuit 232) and the pins of the coprocessor 204 (more particularly, the general purpose processor core 212), and the control channel 218 may be arranged to transmit control messages between the application specific processor 206 (more particularly, the accelerator circuit 232) and the coprocessor 204 (more particularly, the general purpose processor core 212).

In an application, the accelerator circuit 232 may receive a data input from the network handler circuit 224, and transmit a data output of the accelerator circuit 232 through the network handler circuit 224, that is, data from the network-attached device 10 is processed by the accelerator circuit 232 and then written back to the network-attached device 10. Since the data is processed in the path of the network-attached device 10 and the accelerator circuit 232 without passing through the general purpose processor 202, in-network computation may be realized. In another application, the accelerator circuit 232 may receive a data input from the network handler circuit 224, and transmit a data output of the accelerator circuit 232 through the storage handler circuit 226, that is, data from the network-attached device 10 is processed by the accelerator circuit 232 and then written to the storage device 20. Since the data is processed in the path of the network-attached device 10, the accelerator circuit 232, and the storage device 20 without passing through the general purpose processor 202, in-network computation may be realized. In another embodiment, the accelerator circuit 232 may receive a data input from the storage handler circuit 226, and transmit a data output of the accelerator circuit 232 through the network handler circuit 224, that is, data from the storage device 20 is processed by the accelerator circuit 232 and then written back to the network-attached device 10. Since the data is processed in the path of the storage device 20, the accelerator circuit 232, and the network-attached circuit 10 without passing through the general purpose processor 202, in-storage computation may be realized. In another application, the accelerator circuit 232 may receive a data input from the storage handler circuit 226, and transmit a data output of the accelerator circuit 232 through the storage handler circuit 226, that is, data from the storage device 20 is processed by the accelerator circuit 232 and then written back to the storage device 20. Since the data is processed in the path of the storage device 20 and the accelerator circuit 232 without passing through the general purpose processor 202, in-storage computation may be realized.

In contrast to file storage, object storage is a non-hierarchical data storage method that does not use a directory tree, where discrete data units (objects) exist at the same level in the storage area, and each object has a unique identifier for the application to retrieve the object. The object storage is widely used in cloud storage, and the computing apparatus 200 provided in the present invention may also be applicable to data processing of an object storage device.

In an object storage application, the APP running on the general purpose processor 202 may offload the data processing of at least a portion of the data processing task to the coprocessor 204 and the application specific processor 206 by calling an API function API_F. For example, the application specific processor 206 is designed to process a kernel function having a kernel identifier, the data processing is arranged to process an object having an object identifier in an object storage device, and the parameters of the API function API_F may include the kernel identifier and the object identifier, wherein the object storage device may be the storage device 20 or the network-attached device 10. For example, the storage device 20 is an SSD connected to the computing apparatus 200 through the PCIe interface; as a result, the computing apparatus 200 and the storage device 20 may be regarded as a computational storage device (CSD) as a whole. In addition, this CSD may be regarded as a portion of the distributed object storage system. Therefore, the storage device 20 may be arranged to store a plurality of objects, and each object has its own object identifier. The APP running on the general purpose processor 202 may call the API function API_F to offload operations of object data processing to the coprocessor 204 and the application specific processor 206. For example, the API function API_F may include csd_sts_csd_put (object_id, object_data, buf_len), csd_sts_csd_put_acc (object_id, object_data, acc_id, buf_len), csd_sts_csd_get (object_id, object_data, buf_len), and csd_sts csd_get_acc (object_id, object_data, acc_id, buf_len), wherein csd_sts_csd_put (object_id, object_data, buf_len) is arranged to write the object data object_data having the object identifier object_id to the storage device 20, csd_sts csd_put_acc (object_id, object_data, acc_id, buf_len) is arranged to process the object data object_data having the object identifier object_id by using the accelerator circuit 232 having the kernel identifier acc_id, and write the corresponding calculation result to the storage device 20, csd_sts csd_get (object_id, object_data, buf_len) is arranged to read the object data object_data having the object identifier object_id from the storage device 20, and csd_sts csd_get_acc (object_id, object_data, acc_id, buf_len) is arranged to transmit the object data object_data with the object identifier object_id that is read from the storage device 20 to the accelerator circuit 232 having the kernel identifier acc_id for processing, and transmit the corresponding calculation result.

For example, operations of csd_sts_csd_put (object_id, object_data, buf_len) may be simply expressed by the following pseudo code.
    struct nvme_cmd io;
    io.opcode=nvme_sdcs;
    io.object_id=object_id;
    io.object_data=&object_data;
    io.xferlen=buf_len;
    return ioctl (fd, NVME_IOCTL_SUBMIT_IO, &io)
In addition, csd_sts_csd_get_acc (object_id, object_data, acc_id, buf_len) may be simply expressed by the following pseudo code.
    struct nvme_cmd io;
    io.opcode=nvme_sdcs;
    io.object_id=object_id;
    io.object_data=&object_data;
    io.acc_id=acc_id;
    io.xferlen=buf_len;
    return ioctl (fd, NVME_IOCTL_SUBMIT_IO, &io)
Please note that the above pseudo codes are only used as an example for illustration, and the present invention is not limited thereto. In addition, the API function API_F actually used by the computing apparatus 200 may be determined according to actual design requirements.

In another object storage application, the network-attached device 10 may be a client in the distributed object storage system, and is connected to the computing apparatus 200 through the network 30. In addition, the storage device 20 may be a portion of the distributed storage system (e.g. a portion of a key-value store). The accelerator circuit 232 is designed to execute a kernel function having a kernel identifier, and the storage device 20 stores an object having an object identifier. The network-attached device 10 may transmit a specific API function through the network 30, and the parameters thereof include the kernel identifier and the object identifier. Therefore, the network subsystem 214 in the computing apparatus 200 receives the specific API function (the parameters thereof include the kernel identifier and the object identifier) from the network 30. Then, the general purpose processor core 212 obtains the kernel identifier and the object identifier from the network subsystem 214, and triggers the kernel function having the kernel identifier (i.e. the accelerator circuit 232) to process the object having the object identifier in the object storage device (i.e. the storage device 20), wherein the accelerator circuit 232 in the application specific processor 206 performs the processing on the object without the intervention of the APP running on the general purpose processor 202.

As mentioned above, the application specific processor 206 is implemented by using an FPGA. Since the internal memory capacity in the FPGA is small, the memory capacity that may be used by the application specific processor 206 (more particularly, the accelerator circuit 232) is limited. However, if the computing device 200 is applied to data processing of an object storage device, the computing device 200 may further use the virtual storage memory technique of the present invention, so that the on-chip memory/embedded memory (e.g. Block RAM (BRAM) or UltraRAM (URAM)) used by the application specific processor 206 (more particularly, the accelerator circuit 232) may be equivalently regarded as having the same large capacity as a storage device. Furthermore, according to the kernel identifier and the object identifier, the general purpose processor core 212 triggers the kernel function having the kernel identifier (i.e. the accelerator circuit 232) to process the object having the object identifier in an object storage device (i.e. the storage device 20). Based on characteristics of the object storage, continuous data of the object having the object identifier may be continuously read and stored into the on-chip memory/embedded memory used by the application specific processor 206 (more particularly, the accelerator circuit 232) according to the capacity of the on-chip memory/embedded memory used by the application specific processor 206 (more particularly, the accelerator circuit 232), for allowing the application specific processor 206 (more particularly, the accelerator circuit 232) to perform the processing until the data processing of the object having the object identifier is completed. In addition, in the process of the object data processing, the general purpose processor core 212 of the coprocessor 204 is responsible for the data movement between the storage device 20 and the on-chip memory/embedded memory used by the application specific processor 206 (more particularly, the accelerator circuit 232) and the synchronization between the kernel function and the APP. As a result, the APP running on the general purpose processor 202 does not need to intervene in the data movement between the storage device 20 and the on-chip memory/embedded memory used by the application specific processor 206 (more particularly, the accelerator circuit 232) and the synchronization between the kernel function and the APP.

Figure 4:
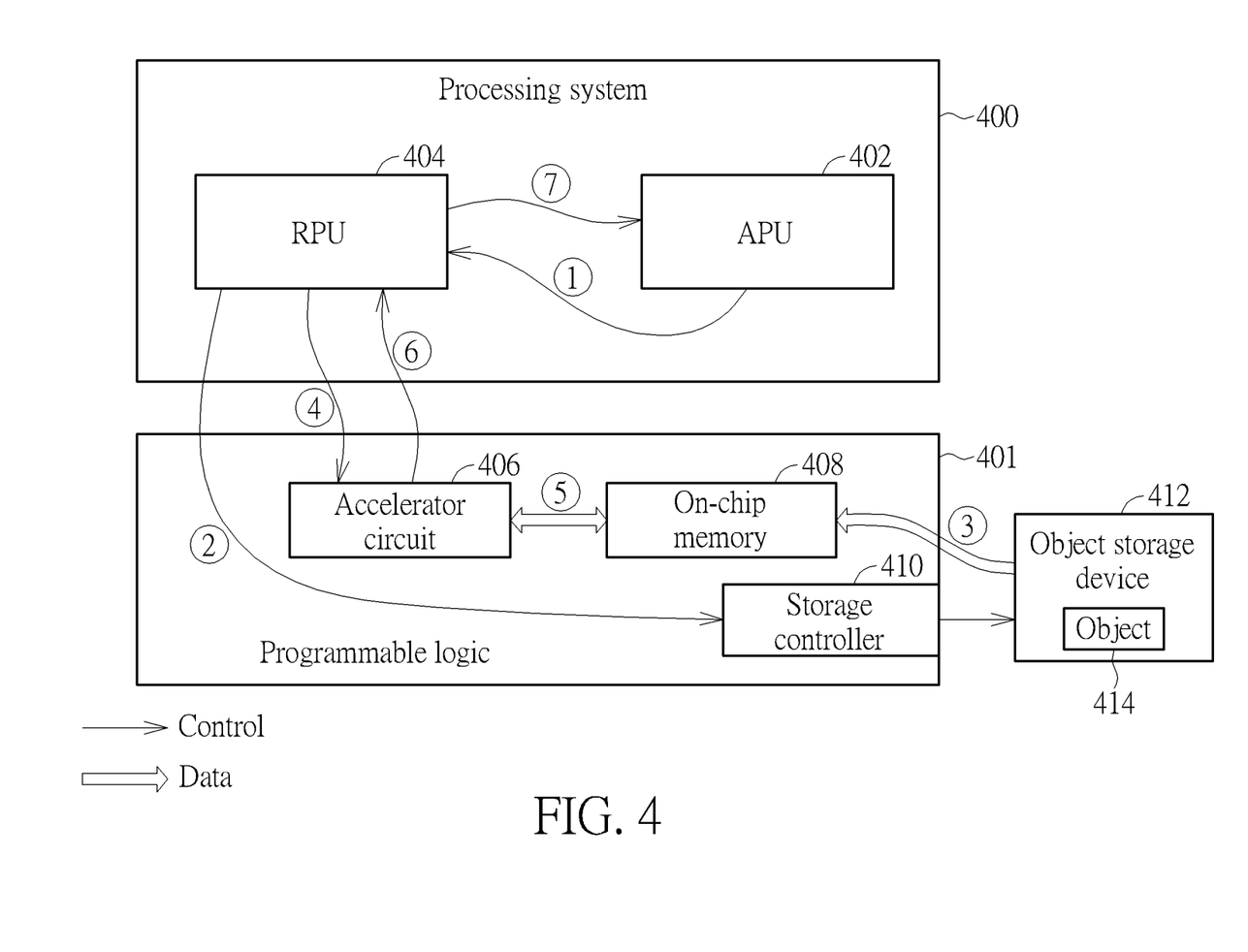
FIG. 4 is a diagram illustrating a computing apparatus using a virtual storage memory technique to deal with object data processing according to an embodiment of the present invention.

FIG. 4 is a diagram illustrating a computing apparatus using a virtual storage memory technique to deal with object data processing according to an embodiment of the present invention. It is assumed that the computing apparatus 200 is implemented by an MPSoC, and the storage device connected to the computing apparatus 200 is an object storage device 412. The MPSoC may be divided into a processing system (PS) 400 and a programmable logic (PL) 401, wherein the PS 400 includes an APU 402 (which is arranged to implement the general purpose processor 202 shown in FIG. 2) and an RPU 404 (which is arranged to implement the general purpose processor core 212 shown in FIG. 2), and the PL 401 includes an accelerator circuit 406 (which is arranged to implement the accelerator circuit 232 shown in FIG. 2), an on-chip memory 408 (e.g. BRAM or URAM), and a storage controller 410 (which is arranged to implement the storage controller 228 shown in FIG. 2). Please note that FIG. 4 illustrates only a portion of the components for brevity. In fact, the MPSoC may include other components of the computing apparatus 200.

In the beginning, the APU 402 sends a command (e.g. an API function) to the RPU 404, wherein the command (e.g. the API function) may include a kernel identifier and an object identifier. In addition, the command (e.g. the API function) may further include some parameters of the PL 401. Then, the RPU 404 determines the storage location of an object 414 having the object identifier, and sends a command to the storage controller 410 according to the buffer size of the on-chip memory 408. Therefore, the storage controller 410 reads a chunk of data in the object 414 that has a data amount equal to the buffer size of the on-chip memory 408 from the object storage device 412, and writes the chunk of data to the on-chip memory 408. Then, the RPU 404 sends a command to the accelerator circuit 406 to trigger the kernel function having the kernel identifier. Therefore, the accelerator circuit 406 reads object data from the on-chip memory 408, and executes the kernel function having the kernel identifier to deal with processing of the object data. After completing the processing of the object data stored in the on-chip memory 408, the accelerator circuit 406 sends a message to inform the RPU 404. Then, the RPU 404 determines whether data processing regarding the object 414 is fully completed. If the data processing regarding the object 414 is not fully completed yet, the RPU 404 sends a command to the storage controller 410 again according to the buffer size of the on-chip memory 408. Therefore, the storage controller 410 reads the next chunk of data in the object 414 that has a data amount equal to the buffer size of the on-chip memory 408 from the object storage device 412, and writes the next chunk of data to the on-chip memory 408. Then, the RPU 404 sends a command to the accelerator circuit 406 to trigger the kernel function having the kernel identifier. Therefore, the accelerator circuit 406 reads object data from the on-chip memory 408 and executes the kernel function having the kernel identifier to deal with processing of the object data. The above steps are repeated until the RPU 404 determines that the data processing regarding the object 414 is fully completed. In addition, when the data processing regarding the object 414 is fully completed, the RPU 404 sends a message to inform the APU 402.

In the embodiment shown in FIG. 2, the programmable circuit 208 includes both the network subsystem 214 and the storage subsystem 216. However, this is only an example for illustration, and the present invention is not limited thereto. Any circuit architecture using the coprocessor and the application specific processor to offload data processing from the general purpose processor falls into the scope of the present invention.

Figure 5:
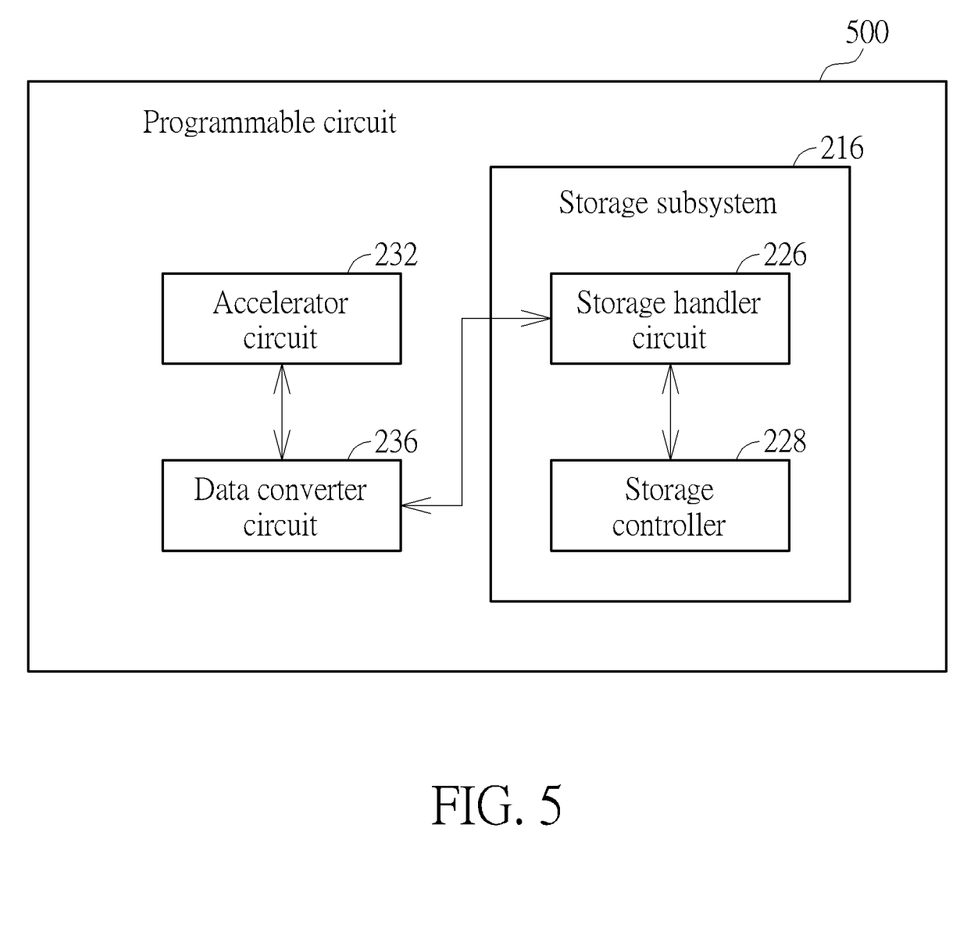
FIG. 5 is a diagram illustrating a programmable circuit according an embodiment of the present invention.

FIG. 5 is a diagram illustrating a programmable circuit according an embodiment of the present invention. The computing apparatus 200 shown in FIG. 2 may be modified to use a programmable circuit 500 shown in FIG. 5, that is, the programmable circuit 208 shown in FIG. 2 may be replaced with the programmable circuit 500. Compared with the programmable circuit 208, the programmable circuit 500 does not include the network subsystem. 214 and the data converter circuit 234. As a result, regarding applications that do not need to be connected to the network-attached device 10 through the network 30, the programmable circuit in the computing apparatus of the present invention may use the design shown in FIG. 5.

Figure 6:
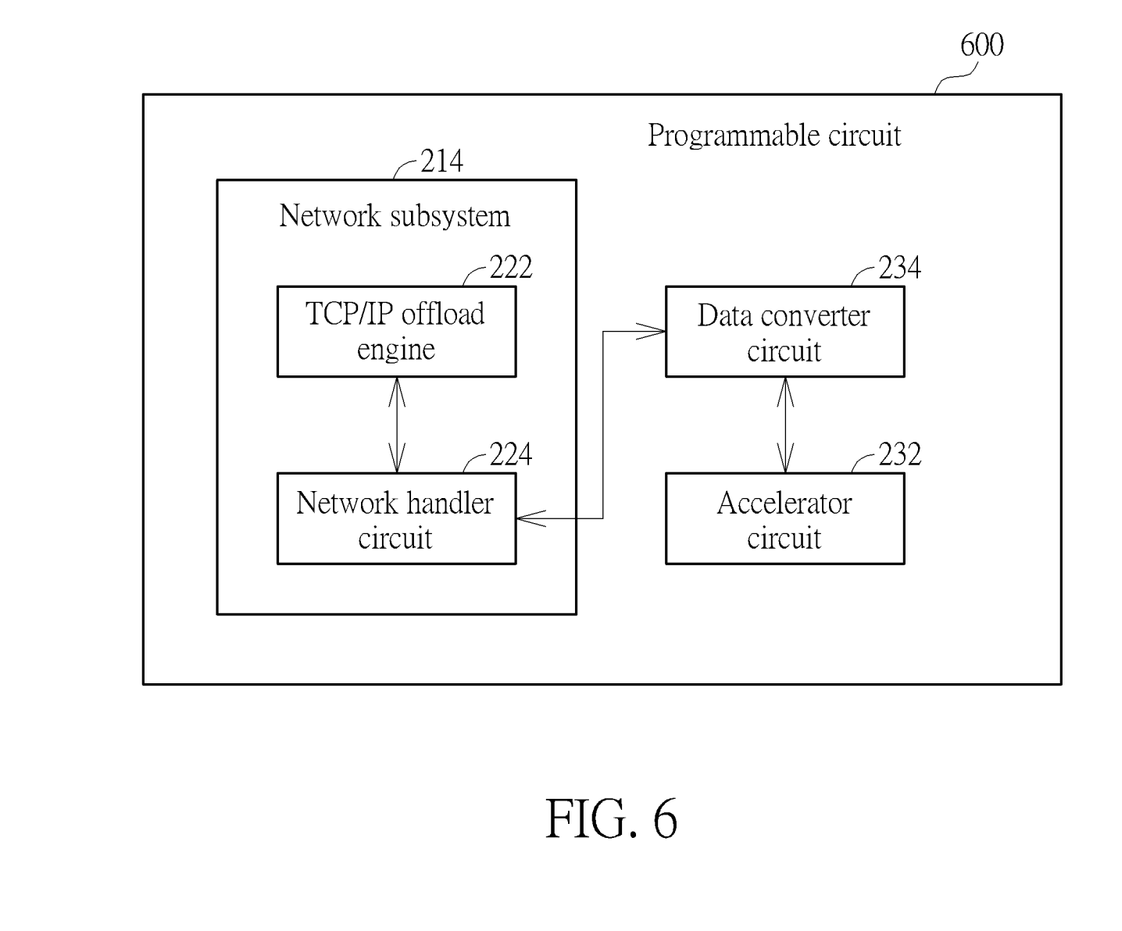
FIG. 6 is a diagram illustrating a programmable circuit according to another embodiment of the present invention.

FIG. 6 is a diagram illustrating a programmable circuit according to another embodiment of the present invention. The computing apparatus 200 shown in FIG. 2 may be modified to use a programmable circuit 600 shown in FIG. 6, that is, the programmable circuit 208 shown in FIG. 2 may be replaced with the programmable circuit 600. Compared with the programmable circuit 208, the programmable circuit 600 does not include the storage subsystem 216 and the data converter circuit 236. As a result, regarding applications that do not need to be connected to the storage device 20 through the input/output interface 40, the programmable circuit in the computing apparatus of the present invention may use the design shown in FIG. 6.

Please note that the data converter circuits 234, 236 shown in FIG. 2, FIG. 5 and FIG. 6 may be optional components. That is, the designer of the computing device may determine whether the programmable circuits 208, 500, 600 need the data converter circuits 234, 236 according to different design requirements. For example, if the pre-defined data format required by the accelerator circuit 232 may cover the data format of the payload data derived from the network flow, the data converter circuit 234 may be omitted. Similarly, if the pre-defined data format required by the accelerator circuit 232 may cover the data format of the data derived from the storage handler circuit 226, the data converter circuit 236 may be omitted. These alternative designs fall within the scope of the present invention.

In summary, the computing apparatus of the present invention may be equipped with the network subsystem to connect to the network and deal with related data regarding the object storage; as a result, the computing apparatus of the present invention has extremely high scalability. In an application, the computing apparatus of the present invention may be compatible with existing object storage services (e.g. Amazon S3 or other cloud storage services); as a result, the computing apparatus of the present invention may refer to the object storage commands (e.g. Amazon S3 Select) from the network to perform related data processing of data capture regarding the object storage device connected to the computing apparatus. In another application, the computing apparatus of the present invention may receive NVMe/TCP commands from the network, and refer to NVMe/TCP commands to perform associated data processing operations on the storage device connected to the computing apparatus. If the storage device connected to the computing apparatus is a portion of a distributed storage system (e.g. a portion of a key value database), the NVMe/TCP commands received from the network may include key-value commands, and the computing apparatus of the present invention may refer to the key-value commands to perform key value database related data processing operations on the storage device. In addition, processing of a data may be completed by a hardware accelerator circuit during the movement of the data, and the general purpose processor that runs the application is not required to intervene in the data movement and the communication between the software and the hardware during the data movement process; therefore, the in-network computation and/or in-storage computation may be implemented, thereby saving power consumption, reducing latency and reducing the load of the general purpose processor. Furthermore, the computing apparatus of the present invention may be implemented by using a multiprocessor system on a chip (MPSoC). For example, the MPSoC may include an FPGA and a general purpose processor core using the ARM architecture, thus having high design flexibility. Designers may design the application/code to be executed by the general purpose processor core and the hardware data processing acceleration function to be embodied by the FPGA according to their needs. For example, the computing apparatus of the present invention may be applicable to data center, and various data types and storage formats may be supported through customization and the best performance may be obtained. Since a single MPSoC may be sufficient to take the place of a high-end server, the data center using the computing apparatus of the present invention may have a lower construction cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computing apparatus comprising:
at least one general purpose processor, arranged to run an application to offload data processing of at least a portion of a data processing task from the at least one general purpose processor to at least one coprocessor and at least one specific application processor;
the at least one coprocessor, arranged to deal with a control flow of the data processing of at least the portion of the data processing task without intervention of the application running on the at least one general purpose processor; and
the at least one application specific processor, arranged to deal with a data flow of the data processing of at least the portion of the data processing task without intervention of the application running on the at least one general purpose processor;
wherein the application running on the at least one general purpose processor offloads the data processing by calling an application programming interface (API) function;
wherein the at least one application specific processor is arranged to deal with a kernel function having a kernel identifier, the data processing of at least the portion of the data processing task is arranged to process an object having an object identifier in an object storage device, and parameters of the API function comprise the kernel identifier and the object identifier.

2. The computing apparatus of claim 1, wherein the control flow running on the at least one coprocessor comprises layers of input/output (I/O) stack.

3. The computing apparatus of claim 1, wherein the at least one general purpose processor and the at least one coprocessor are heterogeneous processors.

4. The computing apparatus of claim 1, wherein the at least one application specific processor is a programmable circuit.

5. The computing apparatus of claim 4, wherein the programmable circuit is a field programmable gate array.

6. The computing apparatus of claim 5, wherein the at least one general purpose processor, the at least one coprocessor, and the at least one application specific processor are all integrated in a same chip.

7. The computing apparatus of claim 1, wherein the at least one application specific processor is arranged to deal with a kernel function having a kernel identifier, and the at least one coprocessor comprises:
a programmable circuit, comprising:
a network subsystem, arranged to receive the kernel identifier and an object identifier from a network; and
at least one general purpose processor core, arranged to obtain the kernel identifier and the object identifier from the programmable circuit, and trigger the kernel function having the kernel identifier for processing an object having the object identifier in an object storage device, wherein the at least one application specific processor deals with processing of the object without intervention of the application running on the at least one general purpose processor.

8. The computing apparatus of claim 1, wherein the at least one coprocessor comprises at least one general purpose processor core, and the computing apparatus further comprises:
a control channel, coupled between pins of the at least one application specific processor and pins of the at least one general purpose processor core, wherein the control channel is arranged to transmit control messages between the at least one application specific processor and the at least one general purpose processor core.

9. The computing apparatus of claim 1, wherein the at least one coprocessor comprises:
at least one general purpose processor core; and
a programmable circuit, comprising a network subsystem, wherein the network subsystem comprises:
a network handler circuit, arranged to communicate with the at least one general purpose processor core and control a network flow; and
the at least one application specific processor comprises:
at least one accelerator circuit, arranged to receive a data input from the network handler circuit, and deal with the data flow of the data processing of at least the portion of the data processing task according to the data input.

10. The computing apparatus of claim 9, wherein the at least one accelerator circuit is further arranged to transmit a data output of the at least one accelerator circuit through the network handler circuit.

11. The computing apparatus of claim 9, wherein the network subsystem further comprises:
a transmission control protocol/internet protocol (TCP/IP) offload engine, arranged to deal with TCP/IP stack between the network handler circuit and a network-attached device.

12. The computing apparatus of claim 9, wherein the programmable circuit further comprises:
at least one data converter circuit, arranged to deal with data conversion between the network handler circuit and the at least one accelerator circuit, wherein a data format of payload data derived from the network flow is different from a pre-defined data format requested by the at least one accelerator circuit.

13. The computing apparatus of claim 9, wherein the network handler circuit is arranged to control the network flow between the at least one accelerator circuit and a part of a distributed object storage system.

14. The computing apparatus of claim 9, wherein the programmable circuit further comprises:
a storage subsystem, comprising:
a storage handler circuit, arranged to communicate with the at least one general purpose processor core and control data access of a storage device;
wherein the at least one accelerator circuit is further arranged to transmit a data output of the at least one accelerator circuit through the storage handler circuit.

15. The computing apparatus of claim 1, wherein the at least one coprocessor comprises:
at least one general purpose processor; and
a programmable circuit, comprising a storage subsystem, wherein the storage sub system comprises:
a storage handler circuit, arranged to communicate with the at least one general purpose processor core and control data access of a storage device; and the at least one application specific processor comprises:
at least one accelerator circuit, arranged to receive a data input from the storage handler circuit, and deal with the data flow of the data processing of at least the portion of the data processing task according to the data input.

16. The computing apparatus of claim 15, wherein the at least one accelerator circuit is further arranged to transmit a data output of the at least one accelerator circuit through the storage handler circuit.

17. The computing apparatus of claim 15, wherein the storage subsystem further comprises:
a storage controller, arranged to perform actual data access on the storage device.

18. The computing apparatus of claim 15, wherein the programmable circuit further comprises:
at least one data converter circuit, arranged to deal with data conversion between the storage handler circuit and the at least one accelerator circuit, wherein a data format of a data derived from the storage handler circuit is different from a pre-defined data format requested by the at least one accelerator circuit.

19. The computing apparatus of claim 15, wherein the programmable circuit further comprises:
a network subsystem, comprising:
a network handler circuit, arranged to communicate with the at least one general purpose processor core and control a network flow;
wherein the at least one accelerator circuit is further arranged to transmit a data output of the at least one accelerator circuit through the network handler circuit.

20. A data processing method comprising:
running an application through at least one general purpose processor to offload data processing of at least a portion of a data processing task from the at least one general purpose processor to at least one coprocessor and at least one specific application processor; and
without intervention of the application running on the at least one general purpose processor, dealing with a control flow of the data processing of at least the portion of the data processing task through the at least one coprocessor and dealing with a data flow of the data processing of at least the portion of the data processing task through the at least one application specific processor;
wherein the application running on the at least one general purpose processor offloads the data processing by calling an application programming interface (API) function;
wherein the at least one application specific processor is arranged to deal with a kernel function having a kernel identifier, the data processing of at least the portion of the data processing task is arranged to process an object having an object identifier in an object storage device, and parameters of the API function comprise the kernel identifier and the object identifier.

* * * * *